Dec. 1, 1970      SEIZO OHTA      3,544,164
SEAT FRAME CONSTRUCTION
Filed July 17, 1968
FIG. 1
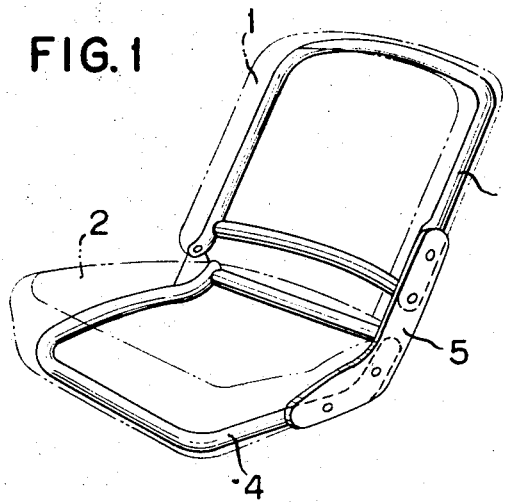
FIG. 2
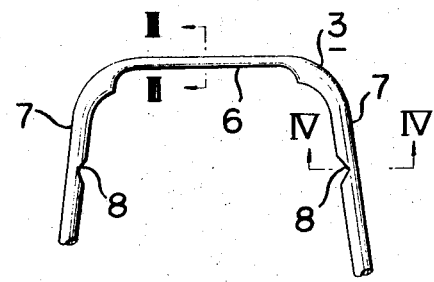
FIG. 3
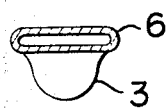
FIG. 5
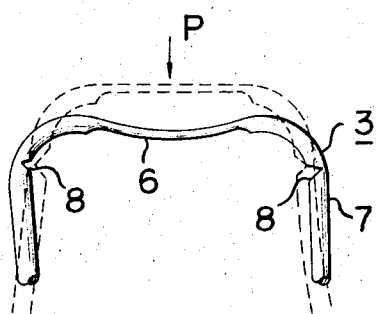
FIG. 4
FIG. 7
FIG. 6
(a)    (b)    (c)
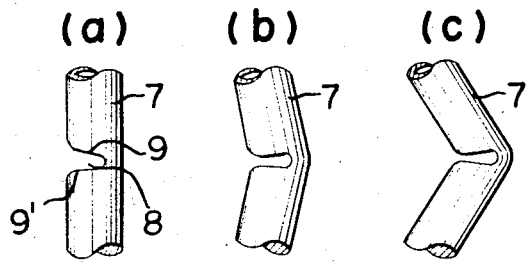
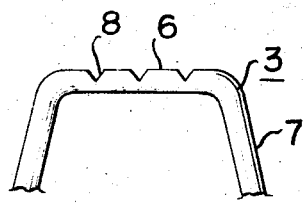
INVENTOR.
SEIZO OHTA
BY McGlew and Toren
Attorneys United States Patent Office 3,544,164
Patented Dec. 1, 1970

3,544,164
SEAT FRAME CONSTRUCTION
Seizo Ohta, Toyota-shi, Japan, assignor to Toyota Jidosha Kogyo Kabushiki Kaisha, Toyota-shi, Aichi-ken, Japan
Filed July 17, 1968, Ser. No. 745,538
Claims priority, application Japan, July 24, 1967, 42/47,229
Int. Cl. A47c 7/14, 7/22
U.S. Cl. 297—452
8 Claims

ABSTRACT OF THE DISCLOSURE

A back frame for a vehicle seat is formed of a continuous section of a member having a uniform cross sectional configuration bent into an inverted U-shape with the horizontal cross member of the U-shape flattened in the vertical direction to insure its tendency to deform under a downwardly applied impact. In addition, a V-shaped indentation can be formed in each of the leg members of the U-shaped frame to assist the deformation of the cross member under a downwardly applied impact.

SUMMARY OF THE INVENTION

The present invention is directed to a seat frame construction for vehicles such as automobiles, aircraft, ships, and the like, and, more particularly, it is directed to a back frame construction which is deformable under downwardly applied loads, yet remains rigid under loads applied in the horizontal direction from the front or rear of the frame.

In vehicles the seats usually are formed of a seat cushion and a back cushion each supported or carried on its respective frame member with the frames usually being interconnected. The frame for the back cushion of the seat is provided with a high rigidity or resistance to deformation against a load or impact imposed on the seat in either the forward or rearward direction, however, in addition the horizontal cross member does not deform under impact applied downwardly to the top portion of the back frame.

When a collision occurs between vehicles or when a vehicle stops suddenly to avoid an accident, any passengers riding in the rear seat have a tendency to be thrown forward and, often, their heads are directed with great force against the rear portion of the front seat striking the top of the back frame. When the frame is unyielding and is formed of a hard material as is required due to its normal function, very serious head injuries can result from such an impact.

Accordingly, it is the primary object of the present invention to provide a back frame for a seat construction in a vehicle in which the upper part of the frame is arranged to deform under impact directed in the downward direction against the frame, while, at the same time, increasing the strength or rigidity of the top member of the back frame against impact or loads applied in the forward and rearward direction.

Another object of the invention is to provide a seat frame construction formed in a simple manner with the top cross member of the frame configured to assure its plastic deformation against a downwardly applied impact.

Still another object of the invention is to employ a continuous tubular section for the side and top cross members of the frame with the top cross member deformed in the vertical direction from its original tubular shape into a flattened tubular shape to reduce its resistance to deformation in a vertical direction while increasing its resistance in the horizontal direction.

Moreover, another object of the invention is to form a V-shaped indentation in the surfaces of each of the side or leg members of the back frame facing one another to assist in the deformation of the top cross member under the application of a downwardly applied impact.

Still, another object of the invention is to supply a back frame construction which is simple to fabricate and affords the requisite deformability in its top cross member for a downwardly applying impact without sacrificing strength to resist impacts or loads applied in either the forward or rearward direction against the frame. Further, the manner in which the top cross member is reshaped increases its resistance to loads applied in the forward and rearward directions.

Therefore, in the present invention the rigidity or resistance to deformation of the top cross member of the seat frame is altered by deforming its cross section to increase its resistance to deformation in the forward or rearward direction while decreasing its resistance to deformation in the downward direction. In this way, when a person riding in the rear seat of a vehicle is thrown forward due to a collision or to a sudden stop and his head strikes the top part of the back frame of the front seat, the ability of the frame to deform under such a downwardly applied impact will effectively limit his head injuries.

One manner of increasing the deformability of the top part of the back frame is to form the frame of a rod-like section having a uniform cross sectional configuration over its length and bending the member into an inverted U-shape with its cross member forming the top part of the back frame. The cross member of the back frame is deformed in the vertical direction to increase its horizontal dimension while decreasing its vertical dimension. In this way its rigidity or resistance to deformation under a downwardly applied impact is decreased. When such an impact takes place, such as the impact caused when a person's head is driven forward against the rear of the front seat, the cross member will tend to deform downwardly absorbing the shock energy of the impact and reducing the likelihood of head injury to the person.

Further, in a preferred embodiment of the invention, the back frame is formed of a tubular section, preferably circular in shape, and the cross member forming the top of the frame is flattened to provide an approximately rectangular cross sectional shape with the original vertical dimension being considerably decreased and the original horizontal dimension being considerably increased. With this change in the shape of the cross member it will be readily apparent that the strength of the cross member to resist deformation due to loads or impact applied in the forward or rearward direction is increased due to the increase in its horizontal dimension. On the other hand, the decrease in its vertical dimension will limit the ability of the cross member to withstand deformation due to vertically applied loads and, therefore, a downward impact against the top of the cross member will cause it to deform downwardly absorbing a considerable portion of the shock energy resulting from the impact.

In the previously described embodiment, the entire extent of the cross member between its junctures with the downwardly extending leg members of the frame is reshaped to afford the reqiusite deformability, however, as an alternative embodiment one or a number of V-shaped recesses or indentations can be formed in the upper surface of the cross member to increase its deformability under a downwardly applied impact.

To increase the ability of the back frame to deform under the application of a downwardly applied impact, V-shaped recesses can be formed in the inwardly facing surfaces of the leg members. While such indentations increase the ability of the entire back frame to deform under a downwardly applied impact they do not affect the strength or rigidity of the frame against loads or impact directed in the forward or rearward direction toward the frame.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a perspective view of a frame for a vehicle seat with the seat and back cushions indicated in phantom;

FIG. 2 is a front view of a portion of a back frame for a seat embodying the present invention;

FIG. 3 is a sectional view taken along line III—III in FIG. 2;

FIG. 4 is a sectional view taken along line IV—IV in FIG. 2;

FIG. 5 is a view similar to that in FIG. 2, however, exhibiting the manner in which the back frame deforms under a downwardly applied impact;

FIGS. 6a, 6b, and 6c are detail views of the indentation formed in the vertical or leg member of the back frame shown in FIG. 2 indicating the progressive deformation of the leg member at the indentation under the impact shown in FIG. 5; and FIG. 7 is a front view of a back frame similar to that shown in FIG. 2, however, illustrating another embodiment of the present invention.

DETAILED DESCRIPTION OF THE INVENTION

In FIG. 1 a seat construction for a vehicle is shown composed of a back cushion 1 and a seat cushion 2, shown in phantom lines, supported by a back frame 3 and a seat frame 4, respectively. An L-shaped plate member 5 interconnects the back frame 3 and the seat frame 4.

In FIG. 2 the upper portion of the back frame 3 is shown formed from a continuous tubular section, such as a pipe, having a uniform cross section in its original shape. The tubular section is bent into an inverted U-shaped configuration providing a cross member 6 forming the top of the frame and disposed in a generally horizontal position and leg members 7 extending downwardly from the opposite ends of the cross member. As indicated in FIG. 3, the cross member 6 is flattened in the vertical direction whereby its vertical dimension is considerably reduced and its horizontal dimension considerably increased. As a result of this change in shape the bending moment or resistance to deformation of the cross member is increased in the horizontal direction and decreased in the vertical direction. As indicated by FIGS. 3 and 4, showing cross sections of the U-shaped back frame, the remainder of the back frame, that is the leg members, retain their rounded tubular configuration. However, V-shaped indentations 8 are formed on the inner surfaces of the leg members, that is the surfaces facing each other, and a plane passing through the apices of the indentations is disposed horizontally.

In FIG. 5 the result of a downwardly directed impact, indicated by the arrow P, against the cross member 6 is illustrated, such as would occur when a person riding in the hear seat of a vehicle is thrown forward and his head strikes the top part of the back frame of the seat in front of him. Due to the downward impact P, the back frame assumes the deformed shape shown in full line in FIG. 5 while the original or undeformed shape of the back frame is shown in dashed lines. Because of its reduced vertical dimension, under the impact P, the cross member will deform downwardly from its original rectilinear horizontal position and will assume the curved configuration illustrated. In addition, the V-shaped indentations 8 in the leg members 7 will assist in absorbing the shock energy resulting from the impact. As the cross member is deformed or deflected downwardly from the position shown in dashed lines to that shown in full lines, the leg members are deflected outwardly assisted by the V-shaped indentations formed in their inner surfaces.

In FIGS. 6a, b and c, the effect of the impact on the cross member 6 within the V-shaped recess 8 in the leg member 7 is shown in progressive steps. In FIG. 6a, the opposite faces 9, 9' are disposed in diverging relationship, this is the normal undeflected position of the back frame 3 as shown in FIG. 2. As the impact P is applied, see FIG. 5, the cross member 6 deforms downwardly and the opposite faces 9, 9' of the recess converge toward one another and finally in FIG. 6c, the opposite faces 9, 9' are disposed in closely spaced, almost contacting relationship, and the vertical or leg sections 7 buckle outwardly. This tendency to buckle, due to the V-shaped indentation 8 in the leg members, increases the ability of the back frame to deform under a downwardly applied impact and reduces the likelihood of serious injury to a passenger if his head should strike downwardly against the top portion of the back frame. It will be appreciated that the ability to absorb impact energy by deforming will be increased by reducing the buckling strength of the leg member 7.

In another embodiment, as shown in FIG. 7, V-shaped indentations 8 are formed in the upper surface of the cross member 6 and have the same general effect of increasing the ability of the cross member to deform under a downwardly applied impact. One or a number of such V-shaped recesses 8 may be formed in the top member to provide the desired deformability.

For purposes of illustration and explanation, the back frame has been shown as formed of a circular tubular member. However, it will be appreciated that other tubular shapes may be employed and similarly solid rod-like sections could also be used which are deformable to increase one dimension while decreasing the other dimension to alter the resistance to bending of the section.

What is claimed is:

1. A frame member for the back portion of a vehicle seat comprises a continuous tubular section having a uniform cross sectional configuration for its length and formed into an inverted U-shape, said U-shape section comprising a cross member disposed substantially horizontally and a leg member depending downwardly from each end of said cross member, at least a portion of said cross member intermediate the junctures thereof with said leg members deformed so that its dimension in the vertical direction is reduced and its dimension in the horizontal direction is increased so that when impact energy is directed downwardly against said cross member it deflects downwardly under plastic deformation while due to the increase in its horizontal dimension said cross member has an increase in its resistance to deflection from impact energy directed in the horizontal plane of said cross member.

2. A frame member, as set forth in claim 1, wherein a substantial continuous portion of the length of said cross member spaced from the junctures with said leg members is deformed for reducing its vertical dimension and increasing its horizontal dimension.

3. A frame member, as set forth in claim 2, wherein said tubular section of the frame has a round cross sectional shape and said cross member thereof is deformed to provide vertically spaced flattened sides on its upper and lower surfaces extending in the horizontal direction.

4. A frame member, as set forth in claim 2, wherein each of said leg members has a V-shaped indentation formed in the inwardly facing surface thereof at a point spaced adjacent to and vertically downward from the juncture thereof with said cross member for assisting in the downward deflection of said cross member under downwardly directed impact energy.

5. A frame member as set forth in claim 4, wherein a plane extending through the apices of said V-shaped indentations is disposed substantially horizontally and extends substantially in parallel relationship with said cross member.

6. A frame member, as set forth in claim 5, wherein the V-shaped indentations in said leg members of said tubular section reduces the cross section of said leg members at the apex of said indentations to afford a semi-circular closed shape.

7. A frame member as set forth in claim 1, wherein at least one linearly extending V-shaped indentation is formed in the upper surface of said cross member at a location spaced intermediate the junctures of said cross member with said leg members.

8. A frame member as set forth in claim 7, wherein the line of the apex of said V-shaped indentations lies in a plane extending substantially perpendicular to the longitudinal axis of said cross member.

References Cited
UNITED STATES PATENTS

| | | | |
|---|---|---|---|
| 3,037,812 | 6/1962 | Monroe | 297—355 |
| 3,165,359 | 1/1965 | Ashkouti | 297—445 |
| 3,437,367 | 4/1969 | Blank | 297—216 |

CASMIR A. NUNBERG, Primary Examiner

U.S. Cl. X.R.

297—216, 353